(12) United States Patent
Maguire et al.

(10) Patent No.: US 8,549,542 B1
(45) Date of Patent: Oct. 1, 2013

(54) CORRELATING INFORMATION FROM MODELED AND NON-MODELED DOMAINS

(75) Inventors: Thomas Robert Maguire, Brewster, NY (US); Jeffrey Mark Nick, West Park, NY (US); Stephen Glen Graham, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 1133 days.

(21) Appl. No.: 12/241,505

(22) Filed: Sep. 30, 2008

(51) Int. Cl.
*G06F 13/00* (2006.01)

(52) U.S. Cl.
USPC .............................. 719/318; 709/223; 709/224

(58) Field of Classification Search
USPC .................................. 719/318; 709/223, 224
See application file for complete search history.

(56) References Cited

U.S. PATENT DOCUMENTS

| | | | |
|---|---|---|---|
| 2004/0172283 A1* | 9/2004 | Vanderveen et al. | 705/2 |
| 2006/0294439 A1* | 12/2006 | Rolia et al. | 714/47 |
| 2007/0058043 A1* | 3/2007 | Thukral | 348/180 |
| 2007/0177523 A1* | 8/2007 | Nagami et al. | 370/252 |
| 2008/0155537 A1* | 6/2008 | Dinda et al. | 718/1 |
| 2008/0239985 A1* | 10/2008 | Karve et al. | 370/254 |
| 2009/0300605 A1* | 12/2009 | Edwards et al. | 718/1 |

* cited by examiner

*Primary Examiner* — Andy Ho
(74) *Attorney, Agent, or Firm* — Krishnendu Gupta; Gerald P. Kazanjian (57) ABSTRACT

Methods and apparatus provide for an event identity manager that defines a topology of resources. The topology of resources represents relationships amongst the resources in a data center and each of the resources comprises resource attributes described in a data model. The event manager acquires event data describing an event that occurred amongst the resources. In addition, the event data comprises a format that is incompatible with the data model. The event manager correlates the event data with the data model in order to determine a locus of the event data within the topology of resources, the locus of the event data being a resource where the event is most likely associated.

20 Claims, 9 Drawing Sheets

CORRELATING INFORMATION FROM MODELED AND NON-MODELED DOMAINS

BACKGROUND

Information technology (IT) is the study, design, development, implementation, support and management of computer-based information systems, particularly software applications and computer hardware. IT deals with the use of electronic computers and computer software to convert, store, protect, process, transmit, and securely retrieve information.

Information technology (IT) service management is an area that includes, at least in part, managing IT systems. IT resource management platforms enable IT managers to view resource information, such as health and performance, from several resources including routers, switches, servers, host computers, applications, storage networks, services and so forth. For example, a user managing an IT system can use a resource management platform to query what content is on a specific server, or query a current capacity of a specific server, receive messages from IT assets, filter and organize IT asset information, etc.

BRIEF DESCRIPTION

Current conventional systems used in IT resource management suffer from a variety of deficiencies. Specifically, current data centers consist of a vast network (or networks) of resources interacting with each other to process, create, manage and store data. A data model identifies the attributes of each resource in the data center. However, some data created by the resources, such as data about events occurring within the various resources, does not adhere to any formal data model. Hence, the event data cannot be effectively used by conventional IT systems management software components to determine the status (or current conditions) of the resources in the data center. Because the event data produced by the resources in the data center is not conformant to a data model, current systems have difficulty processing event data in order to track (or anticipate) the effects of a particular event between resources that share a relationship (or dependency) in the data flow of the data center.

Techniques discussed herein significantly overcome the deficiencies of conventional systems such as those discussed above. As will be discussed further, certain specific embodiments herein are directed to an event identity manager which correlates event data created by resources in a data center with a data model used by the IT systems management software components in order to identify to which resource the event most likely associated.

Specifically, when a resource creates event data (such as a log entry in a log file) in response to an occurrence of an event in the resource, the event data has attributes that are suggestive of the resource's identity. However, the attributes in the event data does not always clearly identify the resource at which the event occurred.

Any formal data model used by IT systems management software components describes the attributes of the resources in the data center. The event identity manager described herein compares the event data with the resource attributes defined by the data model in order to detect a similarity between the both sets of data. If there is a match between the event data and resource attribute(s) which meets a threshold of similarity, the event identity manager determines that the event most likely occurred at (or is associated with) a resource that is associated with the matching resource attribute(s).

For example, a data center can have a topology of resources, where the topology defines the relationships (e.g. dependencies, data flow, interactions, arrangement) between the resources. Upon detection of a first event at a first resource, the first resource creates a log entry describing the first event. In addition, a second resource that has a topological relationship with the first resource experiences a second event that is related to the first event occurring at the first resource. The second resource creates a log entry describing the second event. However, both log entries have a format non-conformant to the data model used by the topology of resources and both log entries contain data attributes that are merely suggestive of the identity of the resource that respectively created the log entries.

Since the first log entry fails to clearly identify which resource created the first log entry, the event identity manager correlates the first log entry with resource attributes defined in the data model in order to determine a resource with which the event is most likely associated. The event identity manager compares an attribute(s) of the first log entry against a collection of resource attributes defined by the data model. When a similarity between the first log entry's attribute and a first resource attribute (from the collection of attributes) meets a threshold level of similarity, the event identity manager determines that the first log entry describes an event that is most likely associated with a first resource that corresponds with the first resource attribute.

The event identity manager detects that the second log entry was created contemporaneously with (or somehow otherwise associated with) the first log entry, which may indicate that the second event occurred in response to the first event. Thus, the event identity manager further correlates the second log entry with resource attributes defined in the data model in order to determine a second resource with which the second event is most likely associated. The event manager compares an attribute(s) of the second log entry against a collection of resource attributes defined by the data model. When a similarity between second log entry's attribute and a second resource attribute meets the required threshold level of similarity, the event identity manager determines that the second log entry describes an event that is most likely associated with a second resource that corresponds with the second resource attribute. If the first resource and the second resource share a topological relationship between each other, the event identity manager indicates that it is highly likely that the first log entry describes an event that is associated with the first resource.

Based on determining a high likelihood that the first event is probably associated with the first resource, the event identity manager can associate data from the first log entry with the first resource—even though the first log entry does not clearly identify the first resource and the first log entry is not compatible with the data model. Thus, if a user interface displays a graphical rendition of the topology of resources, the event identity manager can integrate data from the first log entry into the display of the first resource in the graphical rendition. The event identity manager thereby provides a visual representation of events occurring within the topology of resources even though the event data does not conform with the data model.

Specifically, in various embodiments, the event identity manager defines a topology of resources. The topology of resources represents relationships amongst the resources in a data center and each of the resources comprises resource attributes described in a data model. The event manager acquires event data describing an event that occurred amongst the resources. In addition, the event data comprises a format that is incompatible with the data model. The event identity manager correlates the event data with the data model in order to determine a locus of the event data within the topology of resources, the locus of the event data being a resource where the event is most likely associated.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by EMC Corporation if Hopkinton, Mass., U.S.A., herein after referred to as "EMC."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for an event identity manager, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Figure 1:
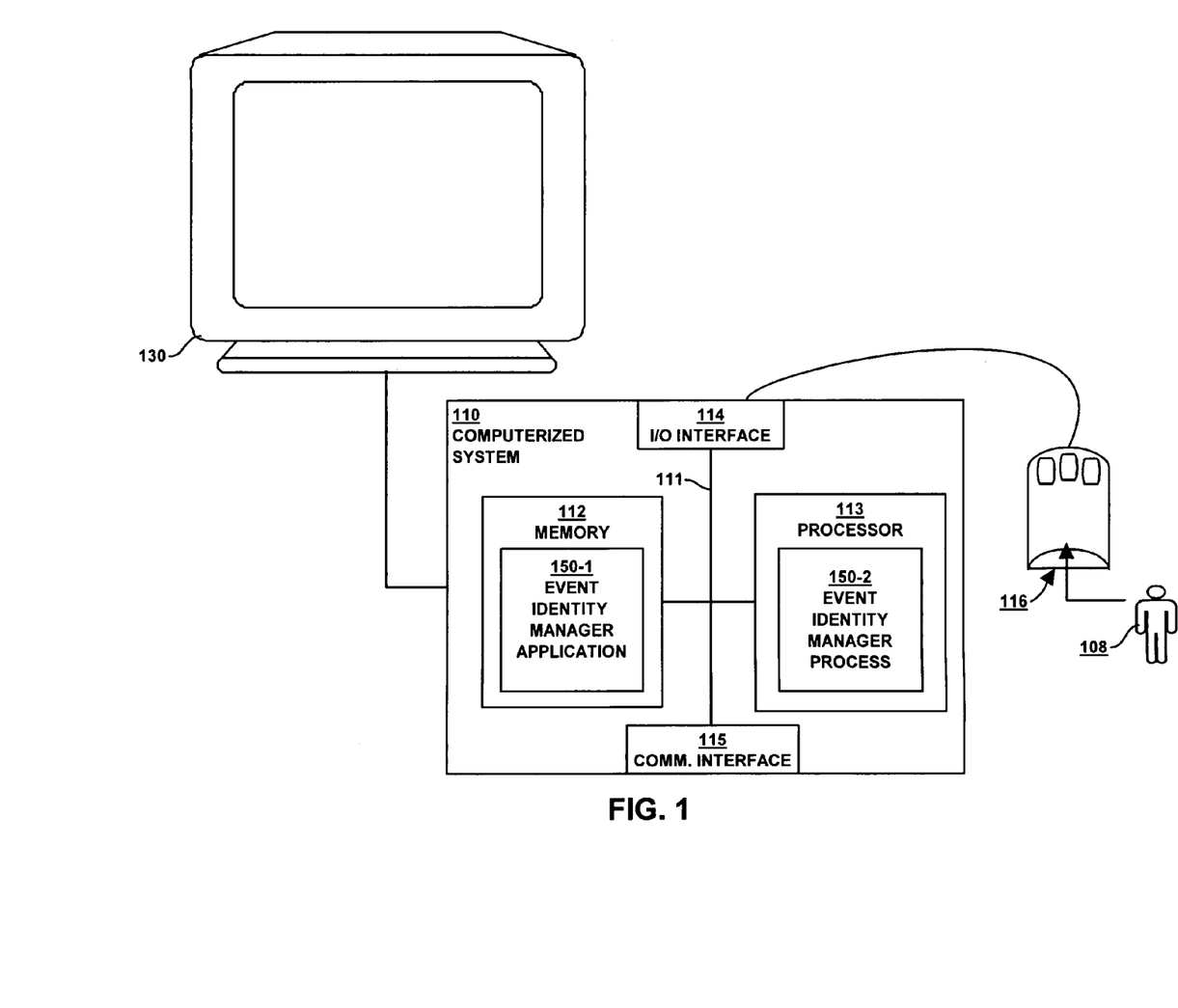
FIG. 1 is an example block diagram illustrating an architecture of a computer system that executes an event identity manager application and/or an event identity manager process according to embodiments herein.

FIG. 1 is an example block diagram illustrating an architecture of a computer system 110 that executes, runs, interprets, operates or otherwise performs an event identity manager application 150-1 and/or event identity manager process 150-2 (e.g. an executing version of an event identity manager 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the event identity manager 150 to user 108. An input device 116 (e.g., one or more user/developer controlled devices such as a keyboard, mouse, touch pad, etc.) couples to the computer system 110 and processor 113 through an input/output (I/O) interface 114.

The computer system 110 can be a client system and/or a server system. As mentioned above, depending on the embodiment, the event identity manager application 150-1 and/or the event identity manager process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the event identity manager application 150-1. Execution of the event identity manager application 150-1 in this manner produces the event identity manager process 150-2. In other words, the event identity manager process 150-2 represents one or more portions or runtime instances of the event identity manager application 150-1 (or the entire application 150-1) performing or executing within or upon the processor 113 in the computerized device 110 at runtime.

The event identity manager application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the event identity manager application 150-1 can be executed on a remotely accessible computerized device via the communication interface 115.

Figure 2:
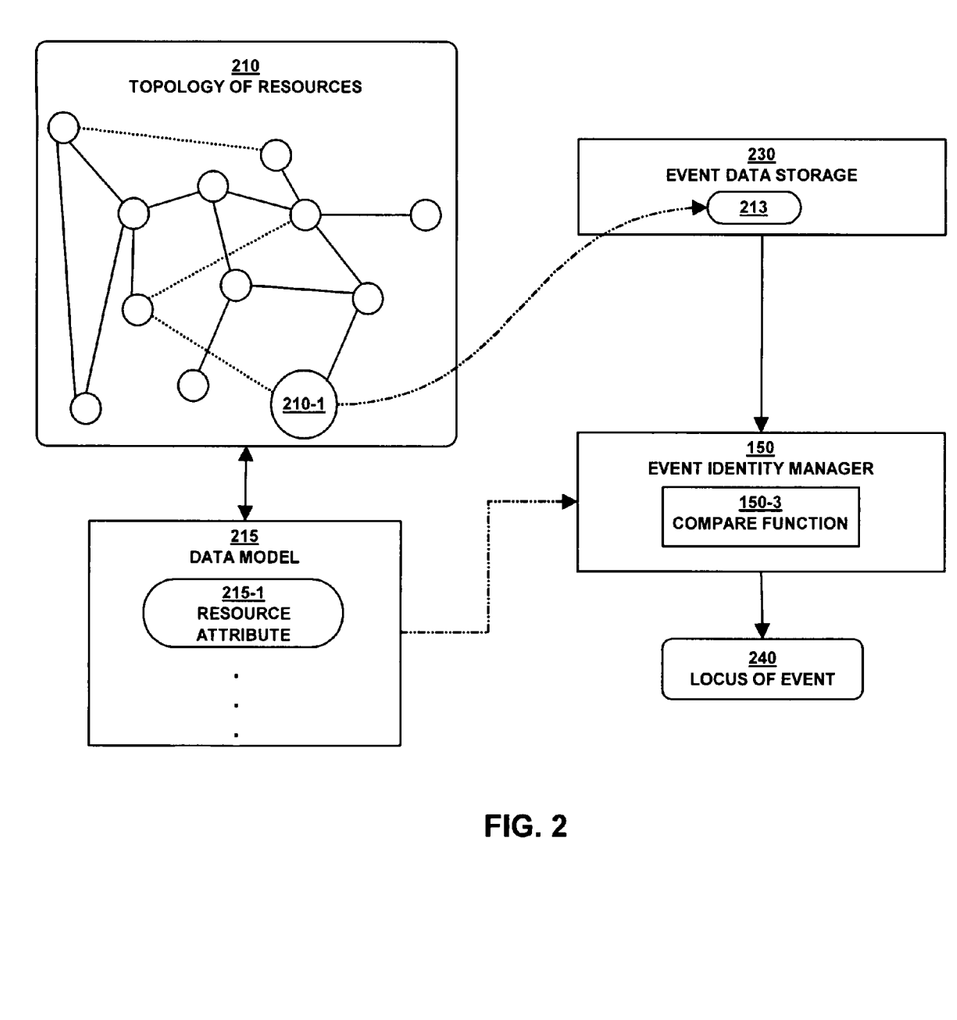
FIG. 2 is an example block diagram of an event identity manager determining a locus of an event within a topology of resources according to embodiments herein.
Figure 3:
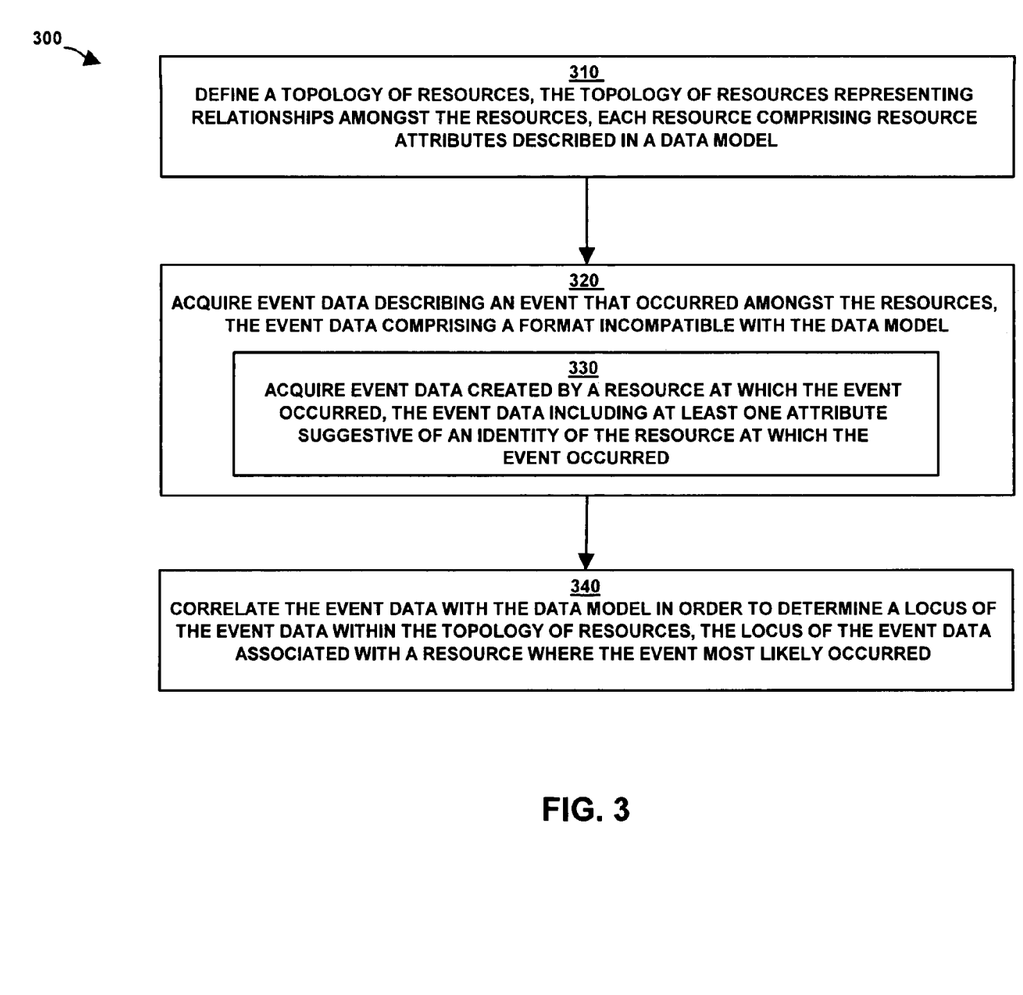
FIG. 3 is a flowchart of an example of processing steps performed by an event identity manager to determine a locus of an event within a topology of resources according to embodiments herein.

FIG. 2 is an example block diagram of an event identity manager 150 determining a locus of an event within a topology of resources according to embodiments herein. In addition, FIG. 3 is a flowchart 300 of an example of processing steps performed by an event identity manager 150 to determine a locus of an event within a topology of resources according to embodiments herein. The aspects of the event identity manager 150 illustrated in FIG. 2 will be discussed in conjunction with a discussion of the processing steps 310-340 of the flowchart 300 of FIG. 3.

At step 310, the event identity manager 150 defines a topology of resources 210 that represents relationships amongst the resources—where each resource has resource attributes described in a data model 215. The data model 215 provides information about the resources to IT systems management software components so that the software components can represent each resource and the relationships between those resources. The data model 215 mirrors the topology of resources 210 in that the data model 215 identifies each resource, describes the attributes of each resource and describes the relationships between the resources. For example, the data model can identify a resource 210-1 as a server with a host name attribute that hosts (has a relationship with) various applications.

At step 320, the event identity manager 150 acquires event data 213 describing an event that occurred amongst the resources, the event data's format is non-conformant to the data model 215. For example, when an event occurs within a resource 210-1, the resource 210-1 created event data that fails to adhere to the data model. Thus, conventional systems cannot identify which resource is associated with the event data 213.

At step 330, the event identity manager 150 acquires event data 213 created by a resource 210-1 at which the event occurred. The event identity manager 150 acquires the event data 213 from event data storage 230 and the event data 213 includes an attribute(s) that is suggestive of an identity of the resource at which the event occurred. However, since the event data 213 is non-conformant (e.g. incompatible, inconsistent) to the data model 215, the event data 213 fails to clearly identify any of the resources with which the event data 213 is associated. In one embodiment, the event identity manager 150 acquires the event data as a log entry within a log file where the log file itself also includes an attribute(s) suggestive of an identity of a resource that created the log file.

At step 340, the event identity manager 150 correlates the event data 213 with the data model 215 in order to determine a locus of the event data 240 within the topology of resources 210, where the locus of the event data 240 is associated with a resource where the event most likely occurred. To determine the locus of the event data 240, the event identity manager 150 compares a collection of resource attributes (as defined by the data model 215) with the event data 213. If a match between an attribute of the event data 213 and a resource attribute 215-1 from the collection of resource attributes meets a threshold of similarity, the event identity manager 150 determines that it is probable that the event data 213 is associated with the resource 210 that has that particular resource attribute 215-1. Hence, the event identity manager 150 determines that the locus of the event 240 within the topology of resources 210 is proximate to the resource 210 that has that particular resource attribute 215-1

It is understood that FIG. 2 (as well as FIG. 4 and FIG. 6) illustrate various embodiments of the event identity manager 150. FIGS. 3, 5, 7, 8 and 9 illustrate various processing steps that can be implemented and performed by the event identity manager 150. The rectangular elements in flowcharts 300, 500, 700, 800, 900 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 300, 500, 700, 800, 900 do not necessarily depict the syntax of any particular programming language. Rather, flowcharts 300, 500, 700, 800, 900 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 4:
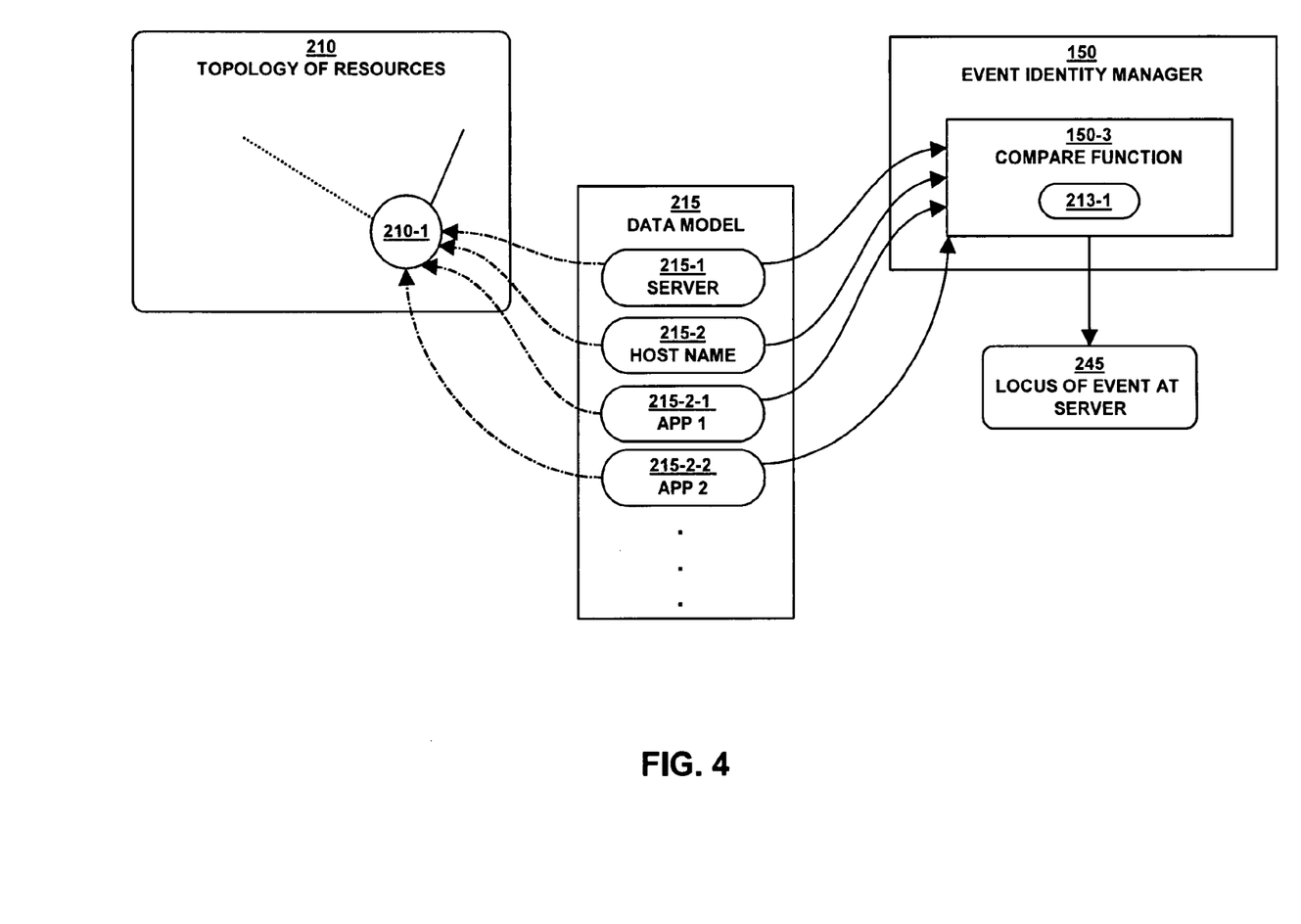
FIG. 4 is an example block diagram of an event identity manager comparing an attribute from event data against a collection of resource attributes according to embodiments herein.

FIG. 4 is an example block diagram of an event identity manager 150 comparing an attribute from event data against a collection of resource attributes according to embodiments herein. In addition, FIG. 3 is a flowchart 300 of an example of processing steps performed by an event identity manager 150 to compares an attribute from event data against a collection of resource attributes according to embodiments herein. The aspects of the event identity manager 150 illustrated in FIG. 4 will be discussed in conjunction with a discussion of the processing steps 510-550 of the flowchart 500 of FIG. 5.

Figure 5:
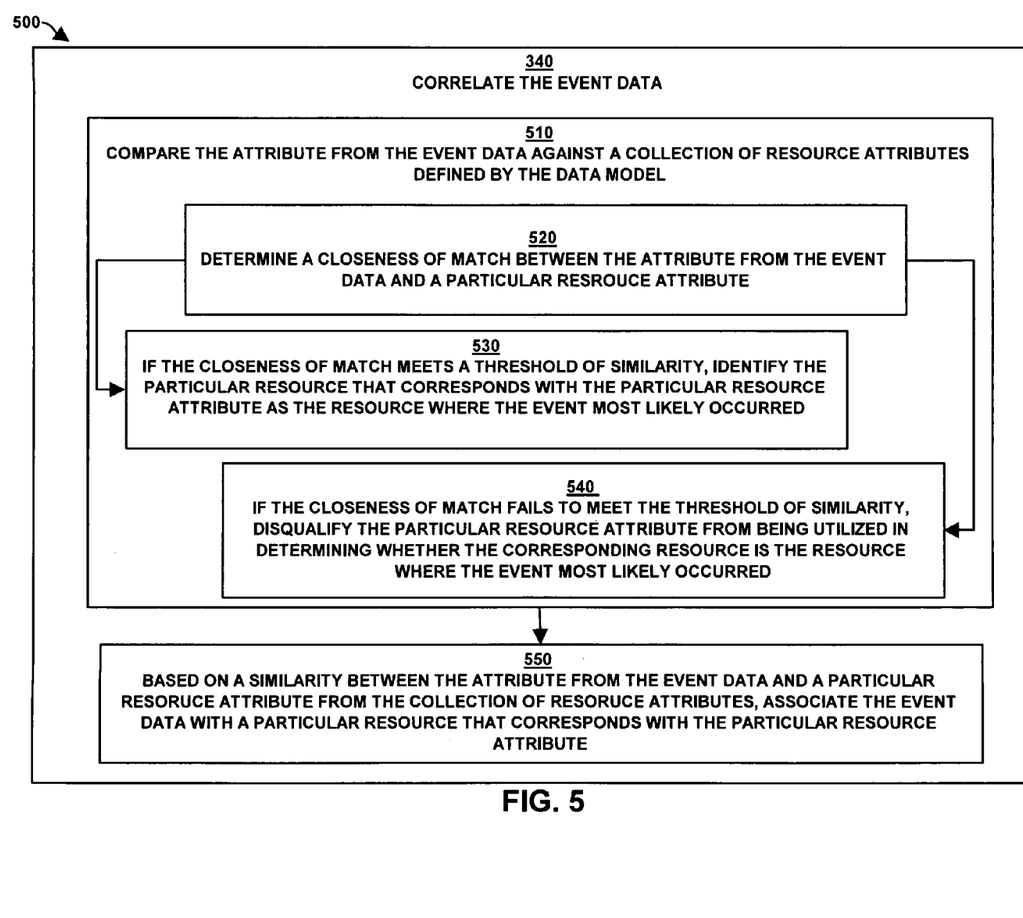
FIG. 5 is a flowchart of an example of processing steps performed by an event identity manager to compare an attribute from event data against a collection of resource attributes according to embodiments herein.

At step 510, the event identity manager 150 compares an attribute 213-1 from event data 213 against a collection of resource attributes 215-1, 215-2, 215-2-1, 215-2-2 defined by the data model 215. As shown in FIG. 4, the data model 215 provides a description of a resource 210-1 in the topology of resources 210. The data model defines a first attribute 215-1 that describes the resource 210-1 as a server, a second attribute 215-2 describing the resource's host name, and two more attributes 215-2-1, 215-2-2 which describe applications hosted by the server. It is understood that the collection of resource attributes in the data model 215 can include resource attributes from all of the other resource in the topology of resources 210.

At step 520, the event identity manager 150 determines a closeness of match between the attribute from the event data and a particular attribute from the collection of attributes. The event identity manager 150 compares each resource attribute described in the data model 215 with an attribute(s) of the event data 213-1 in order to find a match between a particular resource attribute and the attribute of the event data 213-1. However, since the event data 213 does not adhere to any formal data model, it is unlikely that the event identity manager 150 will find an identical match between the event data attribute 213-1 and any of the resource attributes described by the data model 215. Thus, the event identity manager 150 seeks to find those resource attributes in the data model that are "similar enough" to the event data attribute 213-1.

At step 530, if the closeness of match meets a threshold of similarity, the event identity manager 150 identifies the particular resource that corresponds with the particular resource attribute as the resource where the event most likely occurred. For example, if the event data attribute 213-1 is similar to the value of the resource attribute 215-1 which identifies the resource 210-1 as a server, the event identity manager 150 determines whether the match between the two attributes 215-1, 213-1 is greater than (or equal to) a required threshold of similarity. If the match between the two attributes 215-1, 213-1 surpasses (or meets) the required threshold of similarity, the event identity manager 150 determines that the event described in the event data 213 is associated with the server described by the resource attribute 215-1. However, at step 540, if the closeness of match fails to meet the threshold of similarity, the event identity manager 150 disqualifies the particular resource attribute 215-1 from being utilized in determining whether the corresponding resource 210-1 is the resource where the event most likely occurred.

At step 550, based on a similarity (which meets the threshold of similarity) between the attribute from the event data 213-1 and the particular resource attribute 215-1 from the collection of resource attributes, the event identity manager 150 associates the event data 213 with a particular resource 210-1 that corresponds with the particular resource attribute 215-1.

Figure 6:
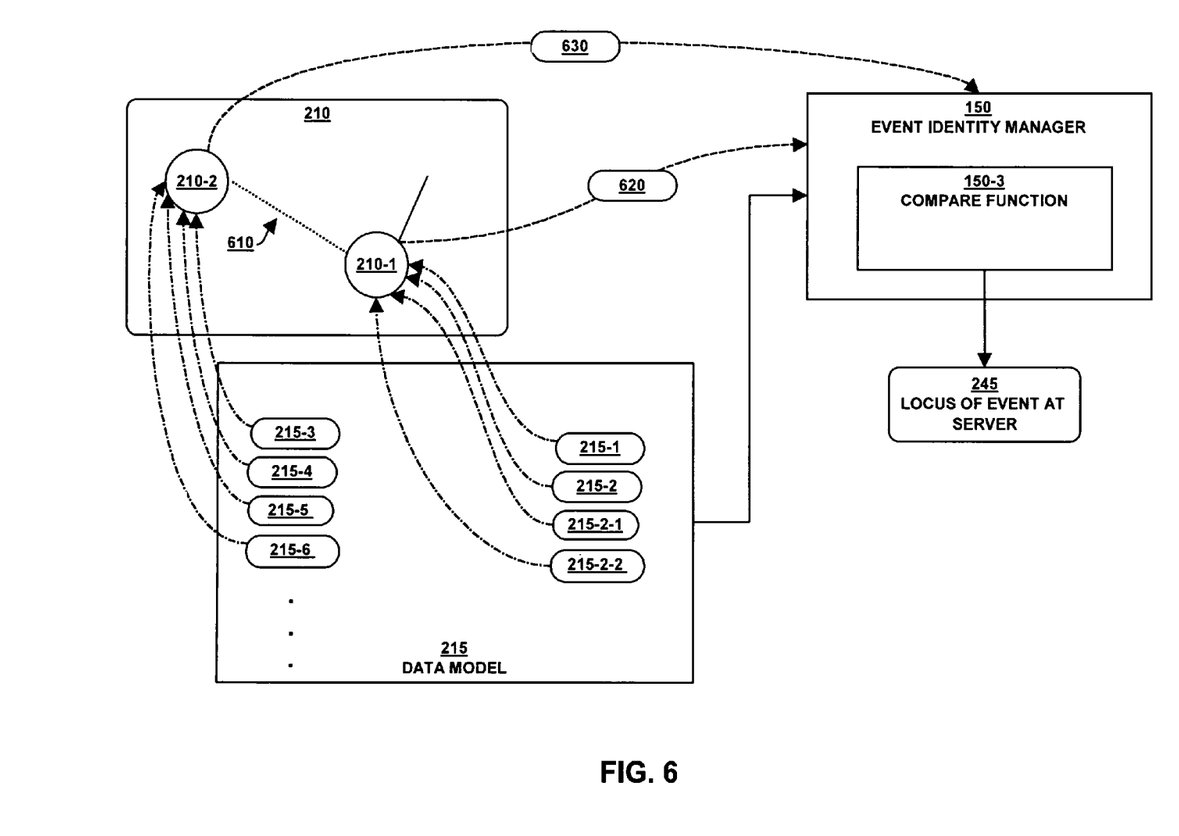
FIG. 6 is an example block diagram of an event identity manager processing multiple log entries in order to determine a locus of an event within a topology of resources according to embodiments herein.
Figure 7:
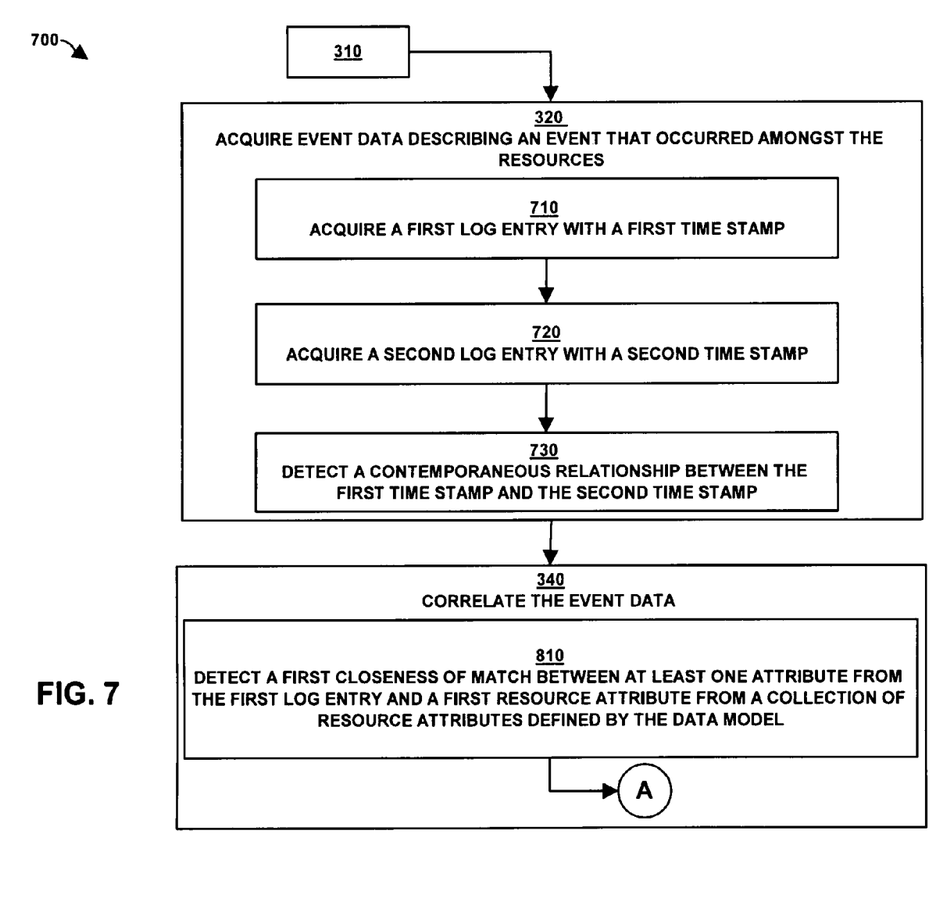
FIG. 7 is a flowchart of an example of processing steps performed by an event identity manager to process multiple log entries in order to determine a locus of an event within a topology of resources according to embodiments herein.
Figure 8:
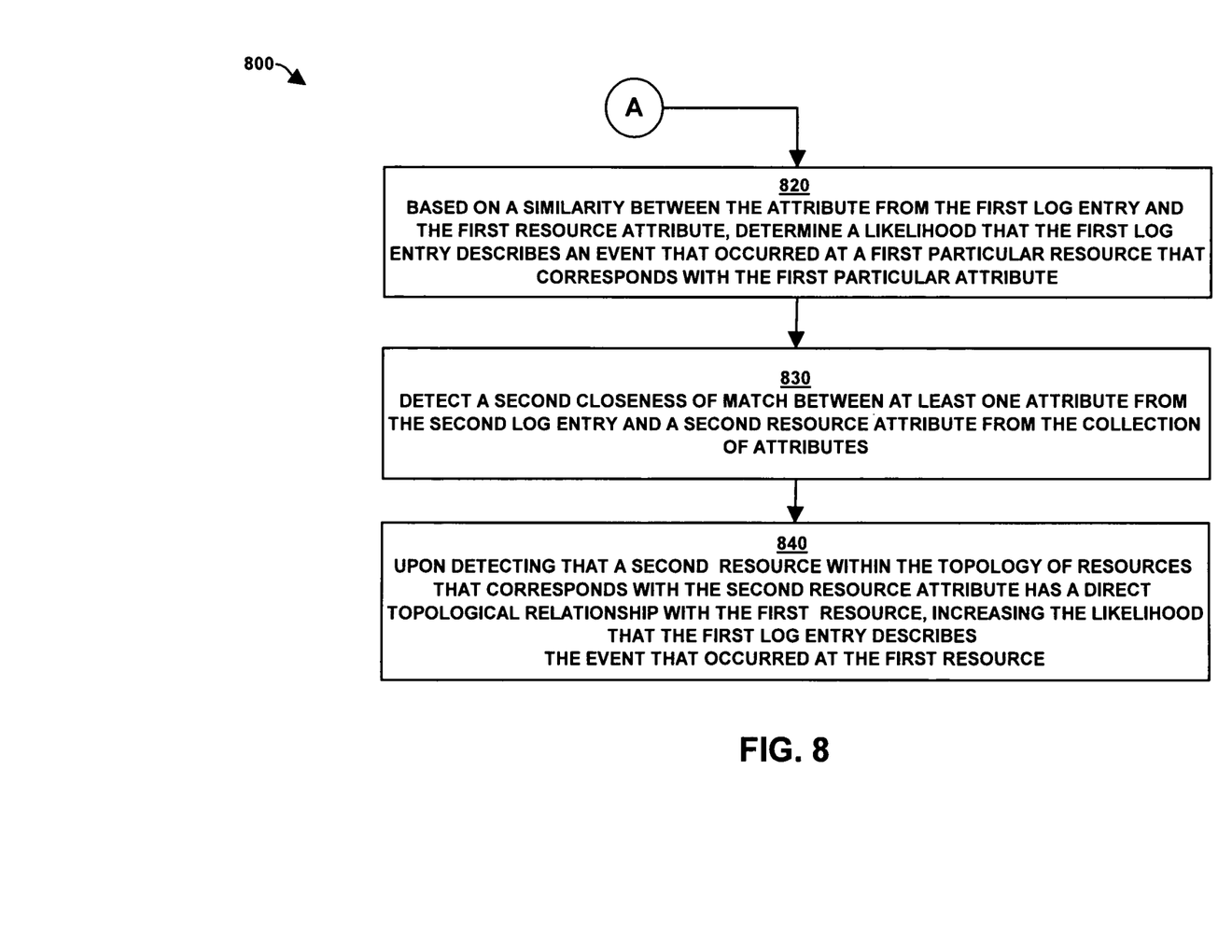
FIG. 8 is a flowchart of an example of processing steps performed by an event identity manager to process multiple log entries in order to determine a locus of an event within a topology of resources according to embodiments herein.

FIG. 6 is an example block diagram of an event identity manager 150 processing multiple log entries in order to determine a locus of an event within a topology of resources according to embodiments herein. In addition, FIG. 7 and FIG. 8 are flowcharts 700, 800 of an example of processing steps performed by an event identity manager 150 to process multiple log entries in order to determine a locus of an event within a topology of resources according to embodiments herein. The aspects of the event identity manager 150 illustrated in FIG. 6 will be discussed in conjunction with a discussion of the processing steps 710-840 of the flowcharts 700, 800.

At step 710, the event identity manager 150 acquires event data, such as a first log entry 620, with a first time stamp. At step 720, the event identity manager 150 acquires a second log entry 630 with a second time stamp. At step 730, the event identity manager 150 detects a contemporaneous relationship between the first time stamp and the second time stamp. Thus, the event identity manager 150 determines that the first log entry 620 and the second log entry 630 may be related in some way in that, due to the fact that both log entries 620, 630 were created within a certain span of time, the second log entry 630 may be describing an event that occurred as a response to the event described in the first log entry 620.

At step 810, the event identity manager 150 detects a first closeness of match between an attribute(s) from the first log entry 620 and a first resource attribute from a collection of attributes defined by the data model 215. The event identity manager 150 compares (via a compare function 150-3) each resource attribute 215-1, 215-2, 215-2-1, 215-2-2, 215-3, 215-4, 215-6 . . . described in the data model 215 with an attribute(s) of the first log entry 620 in order to find a match between a first resource attribute and the attribute of the first log entry 620. However, since the first log entry 620 does not conform (or adhere) to any formal data model, there will not be an identical match between an attribute(s) of the first log entry 620 and any of the resource attributes described by the data model 215. Thus, the event identity manager 150 seeks to find those resource attributes in the data model 215 that closely resemble the attribute(s) of the first log entry 620 to a certain degree. Such resemblance will be the basis by which the event identity manager 150 associates the first log entry 620 with a resource (in the topology of resources 210) that corresponds with the "matching" resource attribute in the collection of resource attributes defined by the data model 215.

At step 820, based on a similarity between the attribute from the first log entry 620 and the first resource attribute 215-1, the event identity manager 150 determines a likelihood that the first log entry 620 describes an event that occurred at a first resource 210-1 that corresponds with the first resource attribute 215-1. For example, if the event identity manager 150 determines that a similarity between a server attribute 215-1 the attribute from the first log entry 620 meet (or surpass) a required threshold of similarity, then the event identity manager 150 considers the similarity between the attribute from the first log entry 620 and the first resource attribute 215-1 as evidence that the event described in the first log entry 620 occurred at the server resource 210-1.

At step 830, the event identity manager 150 detects a second closeness of match between an attribute(s) from the second log entry 630 and a second resource attribute 215-3 from the collection of attributes. The event identity manager 150 compares (via the compare function 150-3) each resource attribute 215-1, 215-2, 215-2-1, 215-2-2, 215-3, 215-4, 215-6 . . . described in the data model 215 with an attribute(s) of the second log entry 630 to find a resource attribute that has similarities with the attribute of the second log entry 630. However, since the second log entry 630 does not adhere to any formal data model, there will not be an identical match between an attribute(s) of the second log entry 630 and any of the resource attributes described by the data model 215.

Thus, the event identity manager 150 seeks to find those resource attributes in the data model 215 that closely resemble the attribute(s) of the second log entry 630 to a certain degree. Such resemblance will be the basis by which the event identity manager 150 associates the second log entry 630 with a resource 210-2 (in the topology of resources 210) that corresponds with the "matching" resource attribute 215-3.

At step 840, upon detecting that a second resource 210-2 within the topology of resources 210 that corresponds with the second resource attribute 215-3 has a direct topological relationship 610 with the first resource 210-1, the event identity manager 150 increases the likelihood that the first log entry 620 describes the event that occurred at the first resource 210-1. For example, since the event identity manager 150 has determined that the second log entry 630 most likely describes an event that occurred at the second resource 210-2 (which is an application in the topology of resources 210) and the first log entry 620 most likely describes an event that occurred at the first resource 210-1 (which is a server), the event identity manager 150 attempts to determine whether the first resource 210-1 and the second resource 210-2 share a relationship 610 within the topology of resources 210.

The event identity manager 150 detects that the relationship 610 between the application (i.e. the second resource 210-2) as being hosted by the server (i.e. the first resource 210-1). Hence, the event identity manager 150 increases the measure of probability that the event described by the first log entry 620 is associated with the first resource 210-1, because the event described by the first log entry 620 most likely triggered an event in the application 210-2 (as described in the second log entry 630). Thus, the event identity manager 150 determines that the locus of the event 245, which is described by the first log entry 620, is at the server 210-2 in the topology of resources 210.

Figure 9:
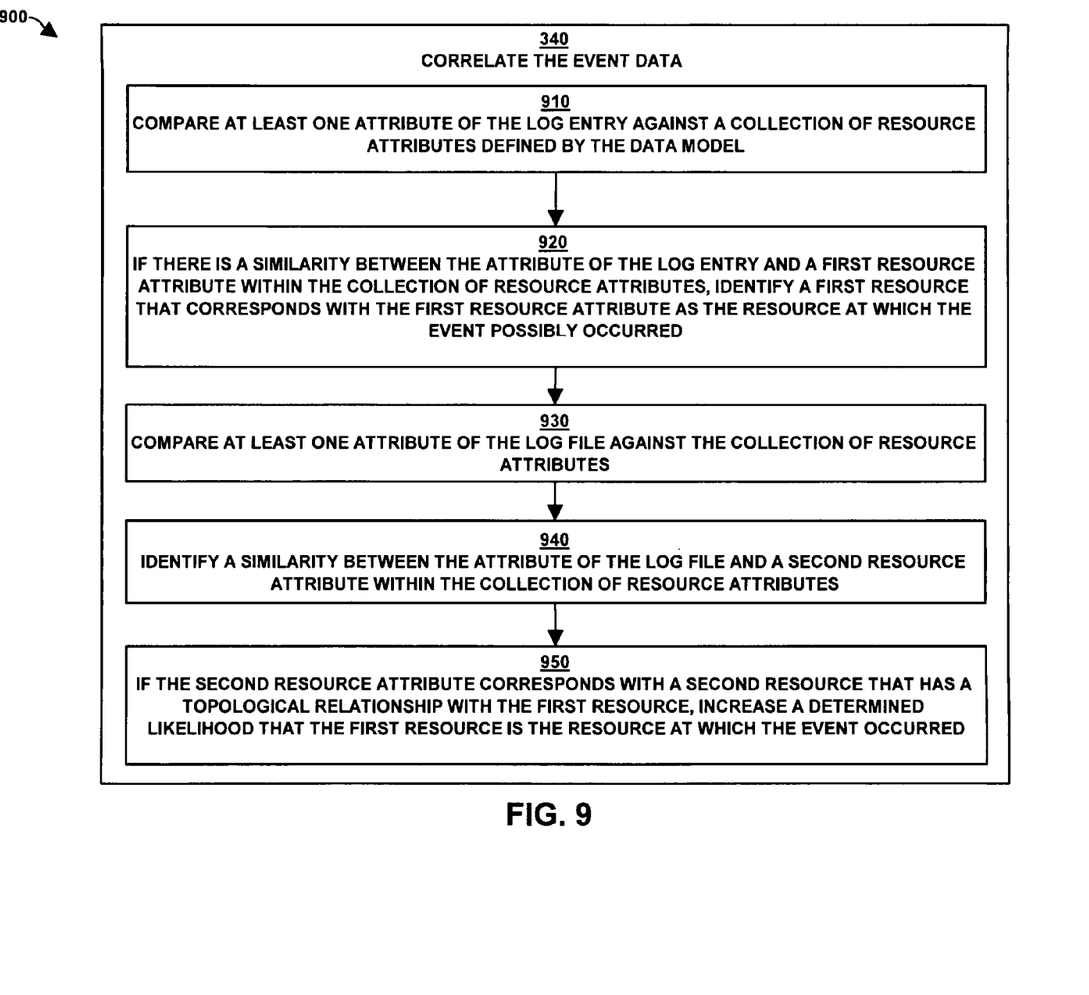
FIG. 9 is a flowchart of an example of processing steps performed by an event identity manager to process a log file and a log entry in order to determine a locus of an event within a topology of resources according to embodiments herein.

FIG. 9 is a flowchart 900 of an example of processing steps performed by an event identity manager 150 to process a log file and a log entry in order to determine a locus of an event within a topology of resources according to embodiments herein.

At step 910, the event identity manager 150 compares an attribute(s) of the log entry against a collection of resource attributes defined by a data model.

At step 920, if there is a similarity between the attribute of the log entry and a first resource attribute within the collection of attributes, the event identity manager 150 identifies a first resource that corresponds with the first resource attribute as the resource at which the event possibly occurred.

At step 930, the event identity manager 150 compares an attribute(s) of a log file against the collection of resource attributes. It is understood that the log entry can be included within the log file or the log entry can be included within another log file.

At step 940, the event identity manager 150 identifies a similarity between the attribute of the log file and a second resource attribute within the collection of resource attributes.

At step 950, if the second resource attribute corresponds with a second resource that has a topological relationship with the first resource at which the event possibly occurred, the event identity manager 150 increases a determined likelihood that the first resource is the resource at which the event occurred.

In another embodiment, comparing at least one attribute of a second log entry against the collection of attributes associated with the resources within the topology of resources; identifying a similarity between the attribute of the second log file and a second particular attribute within the collection of attributes; and if the second particular attribute corresponds with a second resource that has a topological relationship with the first resource at which the event possibly occurred, increasing a likelihood that the first resource is the resource at which the event occurred.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method comprising:
    defining a topology of resources, the topology of resources representing relationships amongst the resources, each resource comprising at least one resource attribute described in a data model identifying attributes of each resource;
    acquiring event data describing an event that occurred amongst the resources, the event data comprising a format incompatible with the data model and failing to clearly identify any of the resources with which the event data is associated;
    correlating the event data in the format incompatible with the data model with the data model in order to determine a locus of the event data within the topology of resources; and
    associating the event data according to the locus of the event data with a suggested resource where the event most likely occurred.

2. The computer-implemented method as in'claim 1, wherein acquiring event data describing an event that occurred amongst the resources comprises:
    acquiring event data created by a resource at which the event occurred, the event data including at least one attribute suggestive of an identity of the resource at which the event occurred.

3. The computer-implemented method as in claim 2, wherein acquiring event data created by a resource at which the event occurred comprises:
    acquiring the event data as a log entry within a log file, the log file including at least one attribute suggestive of an identity of a resource that created the log file.

4. The computer-implemented method as in claim 2, wherein correlating the event data with the data model in order to determine a locus of the event data within the topology of resources comprises:
    comparing the attribute from the event data against a collection of resource attributes defined by the data model; and
    based on a similarity between the attribute from the event data and a particular resource attribute from the collection of resource, associating the event data with a particular resource that corresponds with the particular resource attribute.

5. The computer-implemented method of claim 4, wherein comparing the attribute from the event data against a collection of resource attributes defined by the data model comprises:
    determining a closeness of match between the attribute from the event data and the particular resource attribute;
    if the closeness of match meets a threshold of similarity, identifying the particular resource that corresponds with the particular resource attribute as the resource where the event most likely occurred; and
    if the closeness of match fails to meet the threshold of similarity, disqualifying the particular resource attribute from being utilized in determining whether the corresponding resource is the resource where the event most likely occurred.

6. The computer-implemented method as in claim 3, wherein correlating the event data with the data model in order to determine a locus of the event data within the topology of resources comprises:
    comparing at least one attribute of the log entry against a collection of resource attributes defined by the data model, the first log entry included within the log file; and
    if there is a similarity between the attribute of the log entry and a particular resource attribute within the collection of resource attributes, identifying a particular resource that corresponds with the particular resource attribute as a first resource at which the event possibly occurred.

7. The computer-implemented method as in claim 6, further comprising:
    comparing at least one attribute of the log file against the collection of resource attributes;
    identifying a similarity between the attribute of the log file and a second particular resource attribute within the collection of resource attributes; and
    if the second particular resource attribute corresponds with a second resource that has a topological relationship with the first resource at which the event possibly occurred, increasing a likelihood that the first resource is the resource at which the event occurred.

8. The computer-implemented method as in claim 6, further comprising:
    comparing at least one attribute of a second log entry against the collection of resource attributes;
    identifying a similarity between the attribute of the second log file and a second particular resource attribute within the collection of resource attributes; and
    if the second particular resource attribute corresponds with a second resource that has a topological relationship with the first resource at which the event possibly occurred, increasing a likelihood that the first resource is the resource at which the event occurred.

9. The computer-implemented method as in claim 1 wherein acquiring event data describing an event that occurred amongst the resources comprises:
    acquiring a first log entry with a first time stamp;
    acquiring a second log entry with a second time stamp; and
    detecting a contemporaneous relationship between the first time stamp and the second time stamp; and
    wherein correlating the event data with the data model in order to determine a locus of the event data within the topology of resources comprises:
        detecting a first closeness of match between at least one attribute from the first log entry and a first resource attribute from a collection of resource attributes defined in the data model; and
        based on a similarity between the attribute from the first log entry and the first resource attribute, determining a likelihood that the first log entry describes an event that occurred at a first resource that corresponds with the first resource attribute.

10. The computer-implemented method as in claim 9, further comprising:
    detecting a second closeness of match between at least one attribute from the second log entry and a second resource attribute from the collection of attributes; and upon detecting that a second resource that corresponds with the second resource attribute has a direct topological relationship with the first resource, increasing the likelihood that the first log entry describes the event that occurred at the first resource.

11. A computer program product including a non-transitory computer-readable storage medium having instructions stored thereon for processing data information, such that the instructions, when carried out by a processing device, enable the processing device to perform the operations for:
   defining a topology of resources, the topology of resources representing relationships amongst the resources, each resources comprising at least one resource attribute described in a data model identifying attributes of each resource;
   acquiring event data describing an event that occurred amongst the resources, the event data comprising a format incompatible with the data model and failing to clearly identify any of the resources with which the event data is associated;
   correlating the event data in the format incompatible with the data model with the data model in order to determine a locus of the event data within the topology of resources; and
   associating the event data according to the locus of the event data with a suggested resource where the event most likely occurred.

12. The computer program product as in claim 11, wherein operations for acquiring event data describing an event that occurred amongst the resources comprise operations for:
   acquiring event data created by a resource at which the event occurred, the event data including at least one attribute suggestive of an identity of the resource at which the event occurred.

13. The computer program product as in claim 12, wherein operations for acquiring event data created by a resource at which the event occurred comprise operations for:
   acquiring the event data as a log entry within a log file, the log file including at least one attribute suggestive of an identity of a resource that created the log file.

14. The computer program product as in claim 12, wherein operations for correlating the event data with the data model in order to determine a locus of the event data within the topology of resources comprise operations for:
   comparing the attribute from the event data against a collection of resource attributes defined by the data model; and
   based on a similarity between the attribute from the event data and a particular resource attribute from the collection of resource, associating the event data with a particular resource that corresponds with the particular resource attribute.

15. The computer program product of claim 14, wherein operations for comparing the attribute from the event data against a collection of resource attributes defined by the data model comprise operations for:
   determining a closeness of match between the attribute from the event data and the particular resource attribute;
   if the closeness of match meets a threshold of similarity, identifying the particular resource that corresponds with the particular resource attribute as the resource where the event most likely occurred; and
   if the closeness of match fails to meet the threshold of similarity, disqualifying the particular resource attribute from being utilized in determining whether the corresponding resource is the resource where the event most likely occurred.

16. The computer program product as in claim 13, wherein operations for correlating the event data with the data model in order to determine a locus of the event data within the topology of resources comprise operations for:
   comparing at least one attribute of the log entry against a collection of resource attributes defined by the data model, the first log entry included within the log file; and
   if there is a similarity between the attribute of the log entry and a particular resource attribute within the collection of resource attributes, identifying a particular resource that corresponds with the particular resource attribute as a first resource at which the event possibly occurred.

17. The computer program product as in claim 16, further comprising operations for:
   comparing at least one attribute of the log file against the collection of resource attributes;
   identifying a similarity between the attribute of the log file and a second particular resource attribute within the collection of resource attributes; and
   increasing a likelihood that the first resource is the resource at which the event occurred if the second particular resource attribute corresponds with a second resource that has a topological relationship with the first resource at which the event possibly occurred.

18. The computer program product as in claim 16, further comprising operations for:
   comparing at least one attribute of a second log entry against the collection of resource attributes;
   identifying a similarity between the attribute of the second log file and a second particular resource attribute within the collection of resource attributes; and
   increasing a likelihood that the first resource is the resource at which the event occurred if the second particular resource attribute corresponds with a second resource that has a topological relationship with the first resource at which the event possibly occurred.

19. The computer program product as in claim 11
   wherein operations for acquiring event data describing an event that occurred amongst the resources comprise operations for:
      acquiring a first log entry with a first time stamp;
      acquiring a second log entry with a second time stamp; and
      detecting a contemporaneous relationship between the first time stamp and the second time stamp; and
   wherein operations for correlating the event data with the data model in order to determine a locus of the event data within the topology of resources comprise operations for:
      detecting a first closeness of match between at least one attribute from the first log entry and a first resource attribute from a collection of resource attributes defined in the data model; and
      based on a similarity between the attribute from the first log entry and the first resource attribute, determining a likelihood that the first log entry describes an event that occurred at a first resource that corresponds with the first resource attribute.

20. A computer system comprising:
   a processor;
   a memory unit that stores instructions associated with an application executed by the processor; and
   an interconnect coupling the processor and the memory unit, enabling the computer system to execute the application and perform operations of:
      defining a topology of resources, the topology of resources representing relationships amongst the resources, each resource comprising at least one resource attribute described in a data model identifying attributes of each resource;

acquiring event data describing an event that occurred amongst the resources, the event data comprising a format incompatible with the data model and failing to clearly identify any of the resources with which the event data is associated;

correlating the event data in the format incompatible with the data model with the data model in order to determine a locus of the event data within the topology resources; and associating the event data according to the locus of the event data with a suggested resource where the event most likely occurred.

* * * * *